(12) United States Patent
Roy et al.

(10) Patent No.: US 7,051,224 B2
(45) Date of Patent: May 23, 2006

(54) METHOD AND APPARATUS FOR CONFIGURING A CLOCK TIMING FEEDBACK PATH

(75) Inventors: Protip Roy, San Diego, CA (US); James A. Gilbert, San Diego, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 677 days.

(21) Appl. No.: 10/100,126

(22) Filed: Mar. 18, 2002

(65) Prior Publication Data
US 2003/0177407 A1    Sep. 18, 2003

(51) Int. Cl.
*H03B 19/00*    (2006.01)

(52) U.S. Cl. ..................................... 713/401

(58) Field of Classification Search ................. 713/401
See application file for complete search history.

(56) References Cited

U.S. PATENT DOCUMENTS

| 5,812,832 | A | 9/1998 | Horne et al. | |
| 6,081,905 | A | 6/2000 | Larsson et al. | |
| 6,515,519 | B1* | 2/2003 | Miyazaki et al. | 327/105 |
| 2003/0098730 | A1* | 5/2003 | Miyazaki et al. | 327/158 |
| 2003/0137360 | A1* | 7/2003 | Wang et al. | 331/100 |

* cited by examiner

*Primary Examiner*—John R. Cottingham
(74) *Attorney, Agent, or Firm*—Meyertons Hood Kivlin Kowert & Goetzel, P.C.; B. Noël Kivlin

(57) ABSTRACT

The present invention provides a method and apparatus for configuring a timing feedback path in a semiconductor device. The apparatus includes an oscillator adapted to provide a reference clock signal. The apparatus further includes at least one buffer layer adapted to receive the reference clock signal and provide a delayed clock signal, a selector adapted to select one of the delayed clock signal and the reference clock signal, and a device adapted to provide an output clock signal such that the selected one of the delayed clock signal and the reference clock signal is substantially in phase with the reference clock signal.

19 Claims, 6 Drawing Sheets

METHOD AND APPARATUS FOR CONFIGURING A CLOCK TIMING FEEDBACK PATH

BACKGROUND OF THE INVENTION

1. Field of the Invention

This invention relates generally to semiconductor devices, and, more particularly, to configuring a clock timing feedback path in a semiconductor device.

2. Description of the Related Art

Processor-based systems from personal computers to mainframes may be used to perform such tasks as managing the finances of corporations, editing feature-length movies, and transmitting information around the globe. These complicated operations may be broken down into numerous smaller logical operations carried out on digital bits of information. To carry out these smaller logical operations, virtually all processor-based systems may be formed from a multitude of semiconductor devices. The internal circuitry of each semiconductor device may include hundreds to thousands of interconnected logic elements such as flip-flops and logic gates.

Processor-based systems generally provide a clock signal to each semiconductor device to coordinate the operation of the logic elements in the semiconductor devices. The clock signal typically oscillates between a logic-high state and a logic-low state at a predetermined frequency, also known as the clock speed. The state of the flip-flops and logic gates in the semiconductor device may be updated in response to the clock signal. For example, the state of the flip-flops may be updated in response to detecting the rising edge of the clock signal. Thus, the speed at which digital information may propagate through a processor-based system, and consequently, the speed at which the system may carry out its operations, may be determined in part by the clock speed.

Clock speeds have increased dramatically in recent years. For example, ten years ago, a top-of-the-line personal computer may have used oscillators with frequencies near 1 MHz. Since then, the oscillator frequencies of top-of-the-line personal computers have increased at least a thousand-fold and the clock speeds in personal computers now routinely exceed 1 GHz. As oscillator speeds rise, it becomes more important to carefully control how the oscillator signals are used to coordinate the operation of the semiconductor devices employed by processor-based systems.

A phase lock loop may be used to control the clock signal provided to logic elements in the semiconductor devices. For example, a reference clock signal may be provided to the phase lock loop, which may use this signal to provide a so-called locked clock signal to a timing path in a logic circuit. To create the locked clock signal, the phase lock loop may be hardwired to a reference point in the timing path. Using a feedback clock signal from the reference point, the phase lock loop may adjust the phase of the locked clock signal so that the locked clock signal received at the reference point is substantially in phase with the reference clock signal received at the phase lock loop, i.e., the rising edge of the locked clock signal may arrive at the specific point at substantially the same time as the rising edge of the reference clock signal arrives at the phase lock loop. Many internal circuits, however, may use a plurality of timing modes that may not all operate efficiently with a clock signal locked to a single reference point in the timing path.

SUMMARY OF THE INVENTION

In one aspect of the instant invention, an apparatus is provided for configuring a timing feedback path in a semiconductor device. The apparatus includes an oscillator adapted to provide a reference clock signal. The apparatus further includes at least one buffer layer adapted to receive an output clock signal and provide a delayed clock signal, a selector adapted to select one of the delayed clock signal and the output clock signal, and a device adapted to provide the output clock signal such that the selected one of the delayed clock signal and the output clock signal is substantially in phase with the reference clock signal.

In one aspect of the present invention, a method is provided for configuring a timing feedback path in a semiconductor device. The method includes providing a first clock signal to a device, wherein the device is coupled to at least one buffer layer capable of providing a second clock signal in response to a third clock signal. The method further includes selecting one of the first clock signal and the second clock signal, providing a fourth clock signal using the selected one of the first and the second clock signals, and providing the third clock signal to the buffer layer using the first and fourth clock signals, such that the second clock signal is substantially in phase with the first clock signal.

BRIEF DESCRIPTION OF THE DRAWINGS

The invention may be understood by reference to the following description taken in conjunction with the accompanying drawings, in which like reference numerals identify like elements, and in which.

Figure 1:
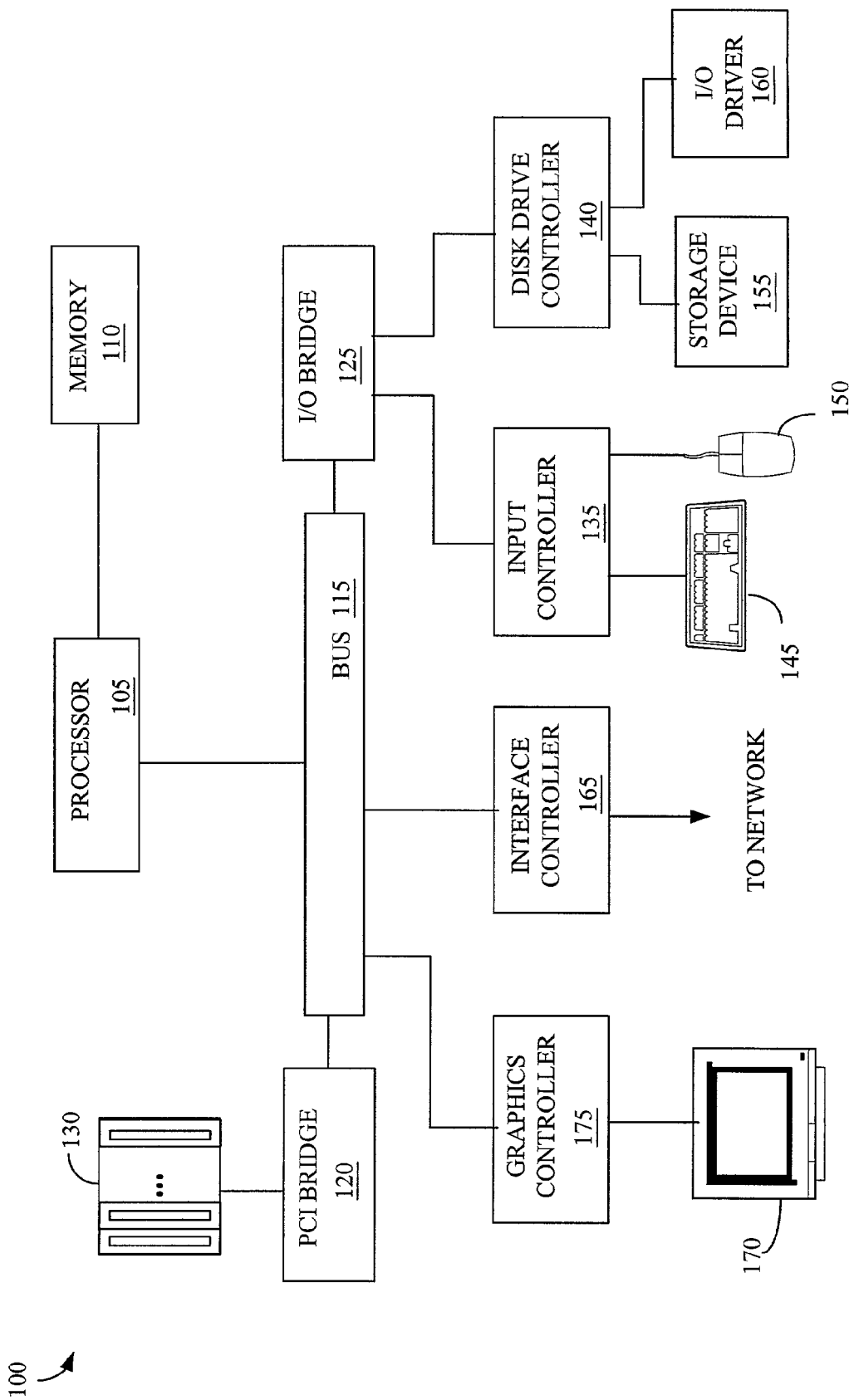
FIG. 1 shows a block diagram of one embodiment of a processor-based system, in accordance with one embodiment of the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Referring now to FIG. 1, a block diagram of one embodiment of a system 100 is shown. For example, the system 100 may be a workstation such as the Sun Blade® Workstation. However, it should be appreciated that, although the discussion that follows will make reference to the system 100 being processor-based, this is not an essential feature of the present invention. The present invention may be used in any of a variety of devices wherein it may be desirable to provide a configurable timing path in one or more semiconductor devices.

The system 100 may comprise at least one processor 105 adapted to perform one or more tasks or to spawn one or more processes. Although not so limited, in one embodiment, the processor 105 may be a 500-MHz UltraSPARC-IIe® processor. The processor 105 may be coupled to at least one memory element 110 adapted to store information. For example, the memory element 110 may comprise 2-gigabytes of error-correcting synchronous dynamic random access memory (SDRAM) coupled to the processor 105 via one or more unbuffered SDRAM dual in-line memory module (DIMM) error-correcting slots (not shown).

In one embodiment, the memory element 110 may be adapted to store a variety of different forms of information including, but not limited to, one or more of a variety of software programs, data produced by the software and/or hardware, and data provided by a network (not shown). Although not so limited, the one or more software programs stored in the memory element 110 may include software applications (e.g. database programs, word processors, and the like) and at least a portion of an operating system (e.g. the Solaris® operating system). The code for the software programs stored in the memory element 110 may, in one embodiment, comprise one or more instructions that may be used by the processor 105 to perform various tasks or spawn various processes.

The processor 105 may be coupled to a bus 115 that may transmit and receive signals between the processor 105 and any of a variety of devices that may also be coupled to the bus 115. For example, in one embodiment, the bus 115 may be a 32-bit-wide, 33-MHz peripheral component interconnect (PCI) bus. A variety of devices may be coupled to the bus 115 via one or more bridges, which may include a PCI bridge 120 and an I/O bridge 125. It should, however, be appreciated that, in alternative embodiments, the number and/or type of bridges may change without departing from the scope of the present invention. In one embodiment, the PCI bridge 120 may be coupled to one or more PCI slots 130 that may be adapted to receive one or more PCI cards, such as Ethernet cards, token ring cards, video and audio input, SCSI adapters, and the like.

The I/O bridge 125 may, in one embodiment, be coupled to one or more controllers, such as an input controller 135 and a disk drive controller 140. The input controller 135 may control the operation of such devices as a keyboard 145, a mouse 150, and the like. The disk drive controller 140 may similarly control the operation of a storage device 155 and an I/O driver 160 such as a tape drive, a diskette, a compact disk drive, and the like. It should, however, be appreciated that, in alternative embodiments, the number and/or type of controllers that may be coupled to the I/O bridge 125 may change without departing from the scope of the present invention. For example, the I/O bridge 125 may also be coupled to audio devices, diskette drives, digital video disk drives, parallel ports, serial ports, a smart card, and the like.

An interface controller 165 may be coupled to the bus 115. In one embodiment, the interface controller 165 may be adapted to receive and/or transmit packets, datagrams, or other units of data over the network, in accordance with network communication protocols such as the Internet Protocol (IP), as described in Request for Comments (RFC) 791, entitled "Internet Protocol," dated September 1981. Other versions of IP, such as IPv6, or other packet-based standards may also be utilized in further embodiments. A version of IPv6 is described in RFC 2460, entitled "Internet Protocol, Version 6 (IPv6) Specification," dated December 1998. Although not so limited, in alternative embodiments, the interface controller 165 may also be coupled to one or more IEEE 1394 buses, FireWire ports, universal serial bus ports, programmable read-only-memory ports, and/or 10/100Base-T Ethernet ports.

One or more output devices such as a monitor 170 may be coupled to the bus 115 via a graphics controller 175. The monitor 170 may be used to display information provided by the processor 105. For example, the monitor 170 may display documents, 2-D images, video graphics, 3-D renderings, and the like.

For clarity and ease of illustration, only selected functional blocks of the system 100 are illustrated in FIG. 1, although those skilled in the art will appreciate that the system 100 may comprise additional or fewer functional blocks. Additionally, it should be appreciated that FIG. 1 illustrates one possible configuration of the system 100 and that other configurations comprising different interconnections may also be possible without deviating from the scope of the present invention. For example, in an alternative embodiment, the system 100 may include additional or fewer bridges 120, 125. As an additional example, in an alternative embodiment, the interface controller 165 may be coupled to the processor 105 directly. Similarly, other configurations may be possible.

The components of the system 100, such as the bus 115, may include one or more semiconductor devices, which may be formed from a plurality of logic elements such as flip-flops, logic gates, and the like. The system 100 may provide a clock signal that may be used to coordinate the operation of the logic elements. However, it may be desirable to vary a phase of the clock signal and to provide this so-called phase-skewed signal to one or more of the semiconductor devices in the system 100.

Figure 2:
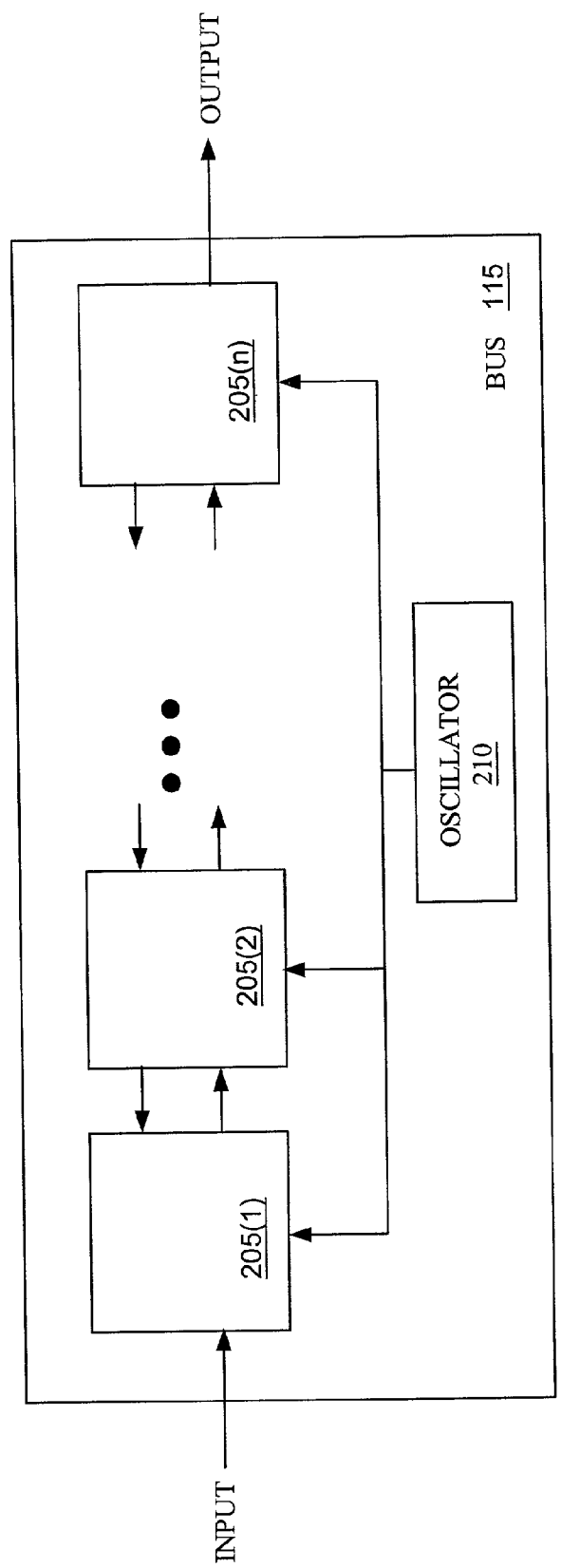
FIG. 2 shows a block diagram of a bus that may be used in the system shown in FIG. 1, in accordance with one embodiment of the present invention.

Referring now to FIG. 2, a block diagram illustrating one embodiment of the bus 115 that may be used in the system 100 is shown. The bus 115 may include one or more coupled semiconductor devices 205(1-$n$). For example, in one embodiment, a first semiconductor device 205(1) in the bus 115 may receive input signals from one or more of the plurality of components in the system 100. The semiconductor device 205(1) may perform one or more logic operations using the input signals and may then provide an output signal to a second semiconductor device 205(2). The first semiconductor device 205(1) may also receive information from the second semiconductor device 205(2). The semiconductor device 205($n$) may be connected to one or more of the plurality of semiconductor devices 205(1-$n$) and may also provide an output signal to one or more of the plurality of semiconductor devices 205(1-$n$). In the interest of clarity, only selected semiconductor devices 205(1-$n$) have been shown connected in an approximately serial fashion. However, it should be appreciated that any desirable number of semiconductor devices 205(1-*n*), connected in any desirable manner or sequence, may be deployed in the bus 115 without departing from the scope of the present invention.

An oscillator 210 maybe connected to the semiconductor devices 205(1-*n*). Although the oscillator 210 is included in the bus 115 shown in FIG. 2, the present invention is not so limited. The oscillator 210 may, in alternative embodiments, be deployed at any desirable location. In one embodiment, the oscillator 210 may provide a clock signal to the semiconductor devices 205(1-*n*), which may use the clock signal to coordinate the operation of their constituent logic elements.

Figure 3:
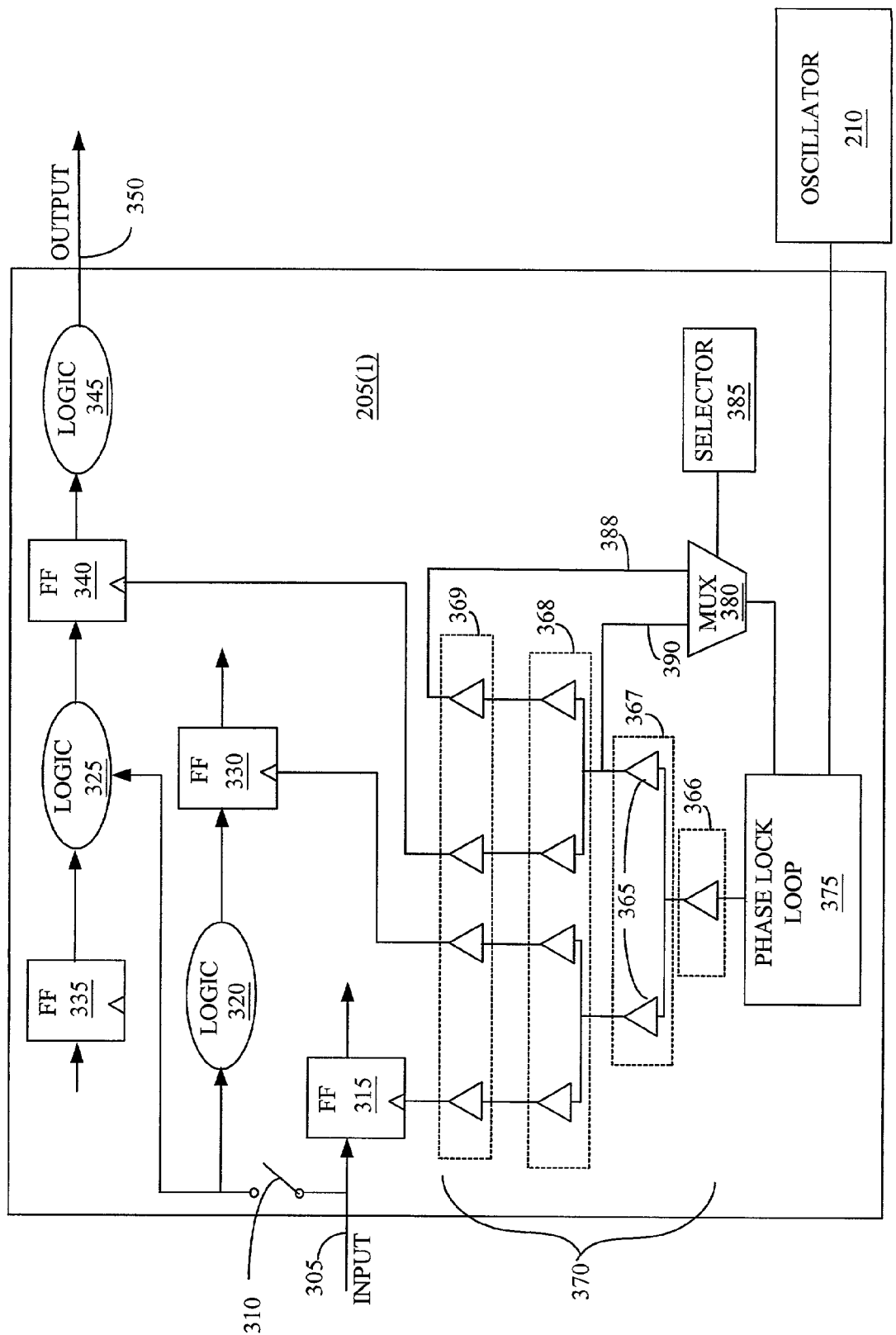
FIG. 3 shows a block diagram of a semiconductor device that may be used in the bus illustrated in FIG. 2, in accordance with one embodiment of the present invention.

FIG. 3 shows a block diagram of one of the plurality of semiconductor devices 205(1-*n*). In one embodiment, data may be provided to the semiconductor device 205(1) through an input port 305, which may be coupled to a switching device 310. When the switching device 310 is open, a state hereinafter referred to as "mode 1," the input port 305 may be coupled to the flip-flop 315. The flip-flop 315 may then provide a signal to additional logic (not shown) in the semiconductor device 205(1). When the switching device 310 is closed, a state hereinafter referred to as "mode 2," the input port 305 may be coupled to logic elements 320 and 325, as well as the flip-flop 315. The logic element 320 may be coupled to a flip-flop 330 and the logic element 325 may be coupled to the flip-flops 335 and 340. The flip-flop 340 may be coupled to a logic element 345 and data may be provided to other semiconductor devices by the logic element 345 through the output port 350.

For clarity and ease of illustration, only selected functional blocks of the semiconductor device 205(1) are illustrated in FIG. 3, although those of ordinary skill in the art will appreciate that the semiconductor device 205(1) may comprise additional or fewer functional blocks. Additionally, it should be appreciated that FIG. 3 illustrates one possible configuration of the semiconductor device 205(1) and that other configurations comprising different interconnections may also be possible without deviating from the scope of one or more embodiments of the present invention. For example, in an alternative embodiment, the semiconductor device 205(1) may include additional or fewer logic elements 320, 325, 345, as well as additional or fewer flip-flops 315, 330, 335, 340.

The state of the flip-flops 315, 330, 335, 340 may be updated in response to a clock signal provided by the oscillator 210. However, in one embodiment, the semiconductor device 205(1) may include hundreds or thousands of flip-flops (not shown). The oscillator 210 may not be able to provide a clock signal with sufficient electrical current to trigger all of the hundreds or thousands of flip-flops. Thus, it may be desirable to provide the clock signal to a plurality of buffers 365, as will be appreciated by those of ordinary skill in the art. The buffers 365 may be deployed in a plurality of buffer layers 366, 367, 368, 369 that may form a buffer tree 370. Although four buffer layers 366, 367, 368, 369 are shown in FIG. 3, it should be appreciated that the number of buffer layers 366, 367, 368, 369, as well as the number of buffers 365 deployed therein, is not material to the present invention. More or fewer buffers 365 may be deployed in more or fewer buffer layers 366, 367, 368, 369 without departing from the scope of the present invention.

Figure 4B:
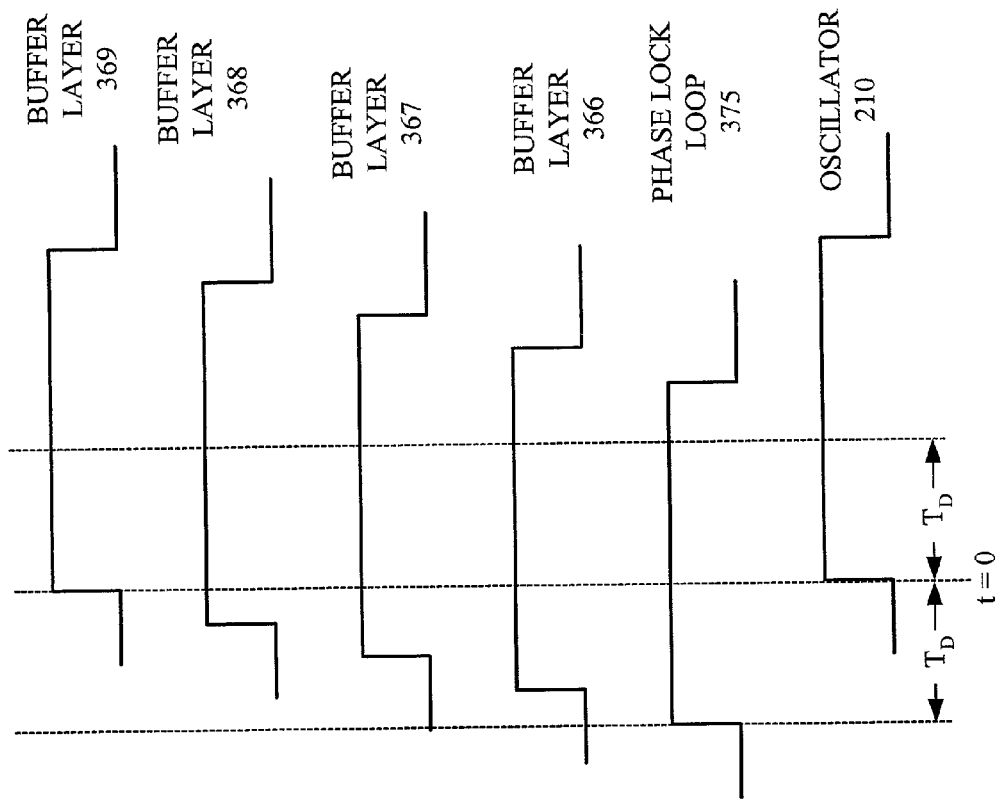
FIGS. 4A–C show exemplary timing diagrams that may be employed in the semiconductor device shown in FIG. 3, in accordance with one embodiment of the present invention.
Figure 4A:
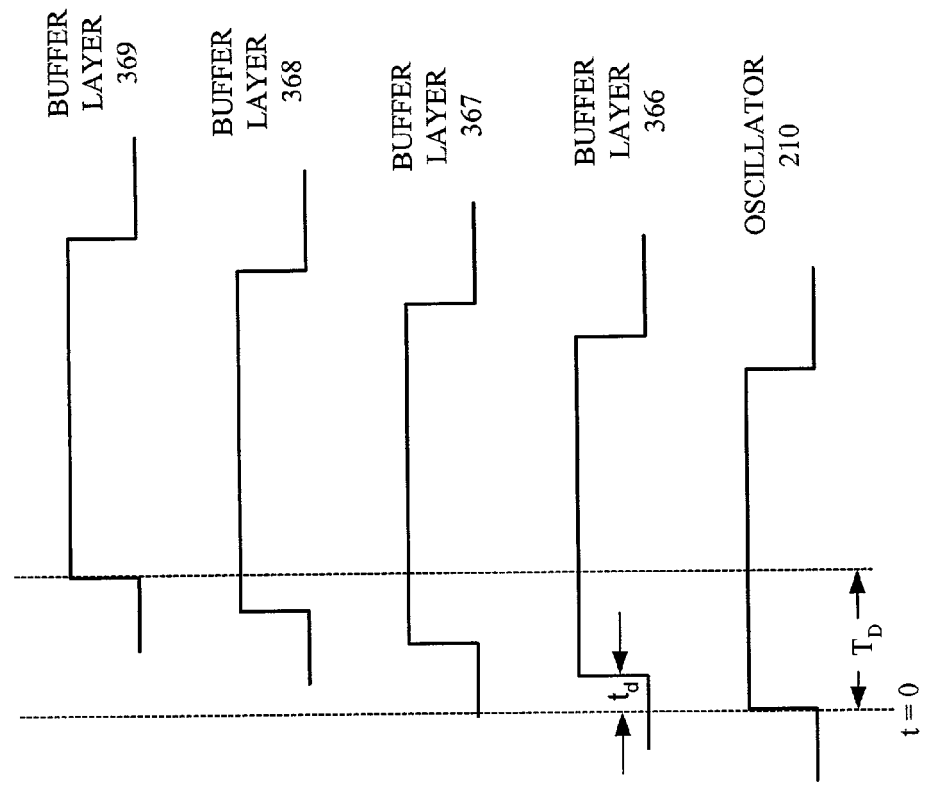

As illustrated by the exemplary timing diagram shown in FIG. 4A, in one embodiment, it may take a finite amount of time for the clock signal to propagate between the buffer layers 366, 367, 368, 369. The oscillator 210 may provide a rising edge of the clock signal to the buffer layer 366 approximately at a time t=0. It may take a finite time for the clock signal to pass through the buffer layer 366, and so the buffer layer 366 may provide the rising edge of the clock signal to the buffer layer 367 at a time $t=t_d$. Thus, in one embodiment, the buffers 365 in the buffer layer 369 may provide the rising edge of the clock signal to the flip-flops 315, 330, 335, 340 at a time $t=4t_d=T_D$.

Referring back to FIG. 3, the oscillator 210 may be coupled to the buffer tree 370 via a phase lock loop 375. However, it will be appreciated that, in alternative embodiments, the oscillator 210 may be coupled to the buffer tree 370 via equivalent devices, such as a delay lock loop, without deviating from the scope of the present invention. In one embodiment, the oscillator 210 may provide a reference clock signal to the phase lock loop 375 and a feedback clock signal may be provided to the phase lock loop 375 by one of the plurality of buffers 365 in one of the plurality of buffer layers 366, 367, 368, 369 via a multiplexer 380. In one embodiment, the phase lock loop 375 may use the reference and feedback clock signals to provide an output clock signal to the buffer tree 370. For example, and as shown in FIG. 4B, the oscillator 210 may provide the rising edge of the reference clock signal to the phase lock loop 375. Using the delayed clock signal provided by the buffer layer 369, the phase lock loop 375 may provide the rising edge to the buffer layer 366 about $4t_d=T_D$ before the oscillator 210 may provide the next rising edge. By providing the rising edge to the buffer layer 366 about $4t_d=T_D$ before the oscillator 210 may provide the next rising edge, the buffer layer 369 may provide the rising edge to the flip-flops 315, 330, 335, 340 at about the same time as the oscillator 210 provides the rising edge to the phase lock loop 375 (i.e., at a time t=0).

Figure 4C:
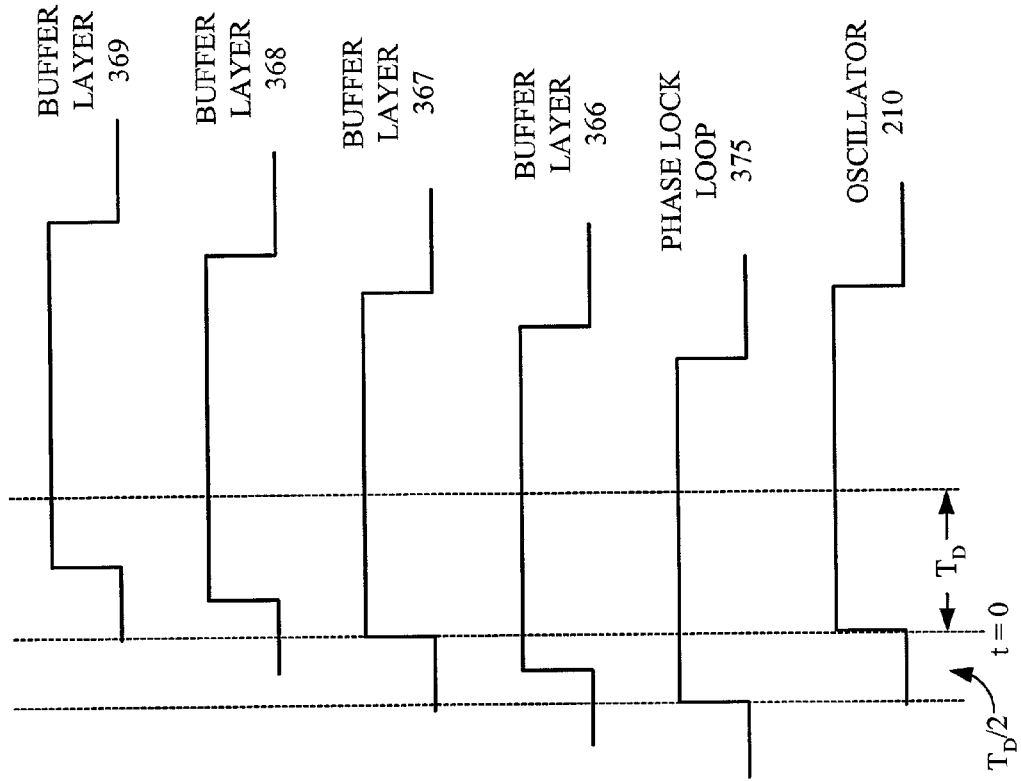

Using the delayed clock signal provided by the buffer layer 367, the phase lock loop 375 may provide the rising edge to the buffer layer 366 about $2td=T_D/2$ before the oscillator 210 may provide the next rising edge. The buffer layer 369 may then provide the clock signal about $2td=T_D/2$ after the reference clock signal may be provided-by the oscillator 210. Hereinafter, providing the clock signal from the buffer layer 369 at a time that is different from the time the oscillator 210 may provide the rising edge will be referred to as providing a "phase skew." In the above example, the phase skew may be about $2td=T_D/2$ as illustrated in FIG. 4C.

Figure 5C:
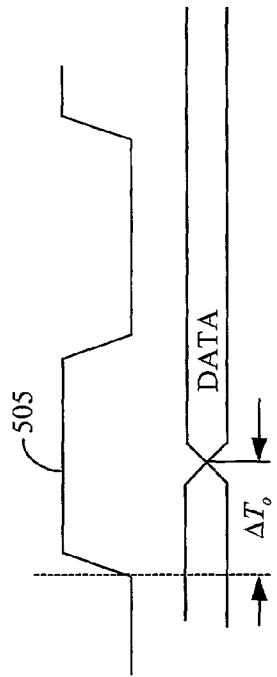
FIGS. 5A–D show exemplary phase-skewed timing diagrams that may be employed in the semiconductor device shown in FIG. 3, in accordance with one embodiment of the present invention.
Figure 5D:
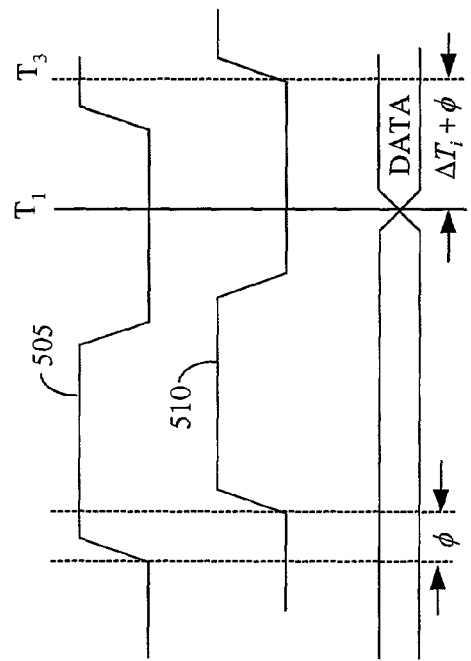
Figure 5A:
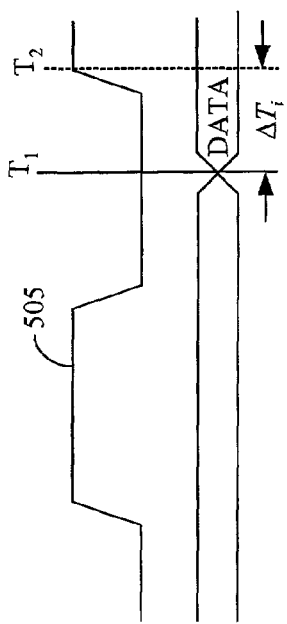
Figure 5B:
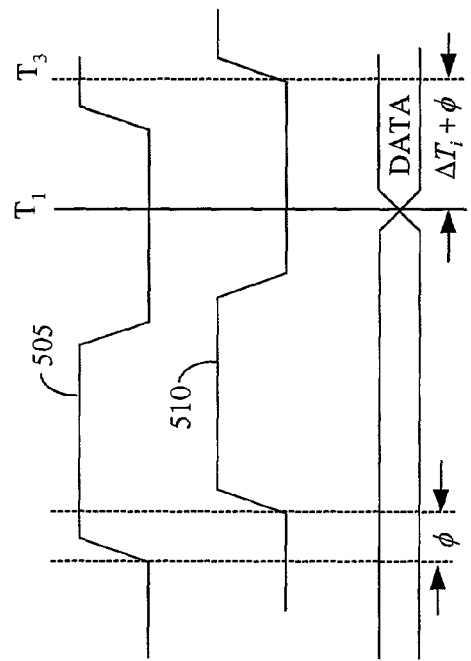

The phase skew may, in one embodiment, be provided for at least one of the plurality of timing modes of the semiconductor device 205(1). For example, in mode 1, it may take a predetermined setup time $\Delta T_i$ for data provided to the input port 305 at a time $T_1$ during a clock cycle 505 to be provided to the flip-flop 315 at a time $T_2=T_1+\Delta T_i$, as shown in FIG. 5A. However, in mode 2, the data provided to the input port 305 at a time $T_1$ during a clock cycle 505 may not propagate through the logic 320 and be provided to the flip-flop 330 until about a time $T_3$. Thus, in mode 2, the setup time $\Delta T_i$ may be increased by providing a phase-skewed clock signal 510 with a phase skew φ, increasing the setup time to $\Delta T_i+\phi=T_3-T_1$, as shown in FIG. 5B. Similarly, in mode 1, data at the output port 350 may be valid for a predetermined output time $\Delta T_o$, as shown in FIG. 5C. In mode 2, however, the output time $\Delta T_o$ may be decreased by providing the phase skewed clock signal 510 with the phase skew φ, effectively decreasing the output time to $\Delta T_o-\phi$ in mode 2, as shown in FIG. 5D.

For a more specific example, in one embodiment, the bus 115 may be a 32-bit-wide, 33-MHz peripheral component interconnect (PCI) bus. The PCI bus may operate in two modes: PCI and PCI-X. It may be desirable to provide the phase-skewed clock signal 510 to the bus 115 when in the PCI mode, but it may not be desirable to provide a phase-skewed clock signal 510 to the bus 115 when in the PCI-X mode.

To provide one or more of phase-skewed clock signals 510 to the phase lock loop 375, the multiplexer 380 may be coupled to a plurality of buffer layers 366, 367, 368, 369, in accordance with one embodiment of the present invention. In FIG. 3, a line 388 couples the multiplexer 380 to the buffer layer 369 and a line 390 couples the multiplexer 380 to the buffer layer 367. It should, however, be appreciated that more or fewer lines 388, 390 may be used to couple the multiplexer 380 to more or fewer buffer layers 366, 367, 368, 369 without departing from the scope of the present invention. In one embodiment, a selector 385 may be coupled to the multiplexer 380 and may be used to select among the plurality of lines 388, 390. The selector 385 may be any of a variety of devices capable of providing a signal to the multiplexer 380 that indicates which line 388, 390 it may be desirable to select and thereby couple to the phase lock loop 375. For example, the selector 385 may be a software register, a hardware register, a switch, a jumper, a pin, and the like. Although FIG. 3 depicts the selector 385 as being deployed in the semiconductor device 205(1), the location of the selector 385 is not material to the present invention. In alternative embodiments, the selector 385 may be deployed at any desirable location without departing from the scope of the present invention.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. An apparatus, comprising:
   an oscillator adapted to provide a reference clock signal;
   at least one buffer layer adapted to receive an output clock signal and provide a delayed clock signal;
   a selector adapted to select one of the delayed clock signal and the output clock signal; and
   a device coupled to receive the reference clock signal and the selected one of the delayed clock signal and output clock signal, wherein the device is adapted to provide the output clock signal such that the selected one of the delayed clock signal and the output clock signal is substantially in phase with the reference clock signal.

2. The apparatus of claim 1, wherein the device is adapted to provide a phase skew between the reference clock signal and the output signal when the delayed clock signal is selected.

3. The apparatus of claim 2, wherein the device is a phase lock loop.

4. The apparatus of claim 2, wherein the device is a delay lock loop.

5. The apparatus of claim 1, further comprising a logic circuit capable of operating in a plurality of timing modes, wherein the logic circuit includes at least one logic element.

6. The apparatus of claim 5, wherein a state of the at least one logic element is updated in response to the delayed clock signal.

7. The apparatus of claim 6, further comprising a switching device capable of selecting one of the timing modes.

8. The apparatus of claim 7, wherein the selector is adapted to select one of the delayed clock signal and the output clock signal based upon the selected timing mode.

9. The apparatus of claim 1, wherein the buffer layer comprises at least one buffer.

10. An apparatus, comprising:
    an oscillator adapted to provide a reference clock signal;
    a plurality of buffer layers adapted to receive an output clock signal and provide a corresponding plurality of delayed clock signals;
    a selector adapted to select a delayed clock signal from one of the plurality of buffer layers; and
    a device coupled to receive the reference clock signal and the selected delayed clock signal, wherein the device is adapted to provide the output clock signal such that the delayed clock signal corresponding to the selected one of the plurality of buffer layers is substantially in phase with the reference clock signal.

11. The apparatus of claim 10, wherein the device is adapted to determine a phase skew between the reference clock signal and the output clock signal using the selected delayed clock signal.

12. The apparatus of claim 11, wherein the device is a phase lock loop.

13. The apparatus of claim 12, wherein the device is a delay lock loop.

14. The apparatus of claim 10, further comprising a logic circuit capable of operating in a plurality of timing modes, wherein the logic circuit includes at least one logic element.

15. The apparatus of claim 14, wherein a state of the at least one logic element is updated in response to at least one of the delayed clock signals.

16. The apparatus of claim 15, further comprising a switching device capable of selecting one of the timing modes.

17. The apparatus of claim 16, wherein the selector is capable of selecting one of the buffer layers based upon the selected timing mode.

18. The apparatus of claim 10, wherein each of the buffer layers comprise at least one buffer.

19. A method, comprising:
    providing a first clock signal to a device, wherein the device is coupled to at least one buffer layer capable of providing a second clock signal in response to a third clock signal;
    selecting one of the first clock signal and the second clock signal;
    providing a fourth clock signal using the selected one of the first and the second clock signals; and
    providing the third clock signal to the buffer layer using the first and fourth clock signals, such that the second clock signal is substantially in phase with the first clock signal.

* * * * *